3,184,478
N,N′ - BIS(TRIFLUOROACETYL)ACTINOSPECTACIN AND THE 9-TRIFLUOROACETYL THEREOF
Robert D. Birkenmeyer and Herman Hoeksema, Kalamazoo, Mich., assignors to The Upjohn Company, Kalamazoo, Mich., a corporation of Delaware
No Drawing. Filed Apr. 4, 1962, Ser. No. 184,954
2 Claims. (Cl. 260—340.3)

This invention relates to novel compositions of matter and to a process for the preparation thereof and is particularly directed to the novel N,N′-bis(trifluoroacetyl) actinospectacin and N,N′-bis(trifluoroacetyl)actinospectacin 9-trifluoroacetate and to a process for producing the same.

Actinospectacin is a biosynthetic product produced by the controlled fermentation of *Streptomyces spectabilis*. Various methods for the production, recovery, and purification of actinospectacin are described in the published literature, e.g., D. J. Mason et al., Antibiotics and Chemotherapy, 11, p. 118, 1961; M. E. Bergy et al., Antibiotics and Chemotherapy, 11, p. 661, 1961; Republic of South Africa Patent No. 60/4098 and Belgian Patent No. 596,175. Actinospectacin is characterized by an optical rotation $[\alpha]_D^{25} = -20°$ ($H_2O$); by solubility in water, methanol, and ethanol, and by insolubility in acetone and hydrocarbon solvents; by the absence of ultraviolet absorption between 220 millimicrons and 400 millimicrons; and by the presence of two basic groups: $pKa_1$ 6.95 ($H_2O$), $pKa_2$ 8.70 ($H_2O$). It was formerly thought that the molecular formula was $C_{14}H_{26}N_2O_7$, but it has since been shown that the molecular formula is $C_{14}H_{24}N_2O_7$. It has now been found that novel compounds according to this invention are obtained by acylating actinospectacin to produce N,N′-bis(trifluoroacetyl)actinospectacin (I), and N,N′-bis(trifluoroacetyl)actinospectacin 9 - trifluoroacetate (II). The novel compounds of the invention can now be represented by the following formulae since the structure of actinospectacin has been elucidated subsequent to this invention.

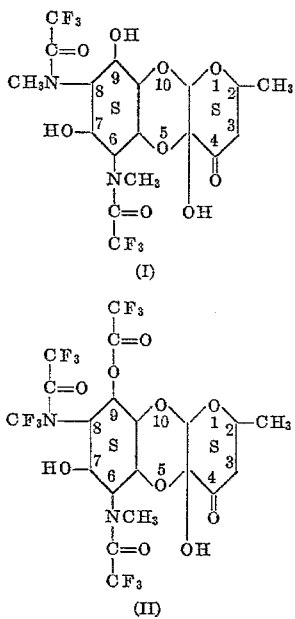

(I)

(II)

Upon reacting actinospectacin with trifluoroacetic anhydride or with a trifluoroacetyl halide in the presence of a suitable acid acceptor, for example, pyridine or a tertiary amine, advantageously of greater basicity than actinospectacin, there are obtained N,N′-bis(trifluoroacetyl)actinospectacin and N,N′-bis(trifluoroacetyl)actinospectacin 9-trifluoroacetate. For example, N,N′-bis(trifluoroacetyl)actinospectacin is obtained, according to this invention, by reacting one mole of actinospectacin with two moles of trifluoroacetic anhydride in the presence of pyridine. When three moles of trifluoroacetic anhydride are used, there is obtained N,N′-bis(trifluoroacetyl)actinospectacin 9-trifluoroacetate.

N,N′-bis(trifluoroacetyl)actinospectacin has antibacterial activity as shown by the following antibacterial spectrum when tested on agar plates by applying 0.08 ml. of a 2 mg./ml. solution of N,N′-bis(trifluoroacetyl)actinospectacin on 9½″ disc:

| Microorganism: | Zone size (mm.) |
|---|---|
| *Salmonella schottmuelleri* | 25 |
| *Klebsiella pneumoniae* | 34 |
| *Sarcina lutea* | 25 |
| *Escherichia coli* | 25 |
| *Proteus vulgaris* | 25 |
| *Staphylococcus aureus* | 25 |
| *Salmonella gallinarum* | 25 |
| *Proteus vulgaris* M.R. (Mixed Resistance) | 37 |
| *Bacillus cereus* | 26 |
| *Proteus rettgeri* | 26 |
| *Pseudomonas U–3029* | 30 |

N,N′-bis(trifluoroacetyl)actinospectacin 9-trifluoroacetate has antibacterial activity as shown by the following table:

| Test organism:** | MIC* (meg./ml.) |
|---|---|
| *Escherichia coli* | 500 |
| *Klebsiella pneumoniae* | 250 |
| *Proteus vulgaris* | 500 |
| *Salmonella paratyphi B* | 250 |
| *Salmonella pullorum* | 1000 |
| *Salmonella typhi* | 500 |
| *Staphylococcus aureus* | 500 |
| *Staphylococcus albus* | 500 |
| *Streptococcus faecalis* | 1000 |

*Minimum inhibitory concentration.
**The test was carried out in standard streptomycin assay broth containing yeast extract at a pH 8.0.

The novel compounds of the invention N,N′-bis(trifluoroacetyl)actinospectacin and N,N′-bis(trifluoroacetyl) actinospectacin 9-trifluoroacetate are useful in preventing the growth and multiplication of various microorganisms in many environments, for example, in preventing the formation of slime in papermill systems caused by the organism *Escherichia coli*; and to prevent or minimize liquefaction in packed yeast caused by *Proteus vulgaris*.

N,N′-bis(trifluoroacetyl)actinospectacin is useful also for treating breeding places of silkworms to prevent or minimize infections caused by *Bacillus cereus*; and to minimize or prevent the deterioration of wool in papermill operations caused by *Bacillus cereus*.

Further, N.N′-bis(trifluoroacetyl)actinospectacin 9-trifluoroacetate is useful as a disinfectant on various dental and medical equiment contaminated with *Staphylococcus albus*; it can also be used as a disinfectant on washed and stacked food utensils contaminated with *Streptococcus faecalis*.

The following examples are illustrative of the process and products of the present invention, but are not to be construed as limiting.

*Example 1.—N,N′-bis(trifluoroacetyl)actinospectacin*

Actinospectacin (13.6 grams) and 250 ml. of pyridine were placed in a 1 liter flask and about 50 ml. of the pyridine was distilled under vacuum at a pot temperature of about 30° C. The flask was flushed with nitrogen, the contents cooled to about −40° C. and 20 ml. of trifluoroacetic anhydride was added dropwise over a five minute period. The pale yellow reaction mixture was stirred at about 25° C. for 18 hours and the pyridine and excess anhydride were removed by vacuum distillation at a pot temperature of about 30° C. The glassy residue was dissolved in 400 ml. of ethyl acetate, washed with ice-cold dilute hydrochloric acid until the washings were acidic, and finally with 200 ml. of ice-water. The ethyl acetate phase was dried over anhydrous magnesium sulfate, filtered and evaporated under vacuum to yield 2.5 g. of a light tan solid. This material was dissolved in about 50 ml. of ether, filtered and evaporated to give N,N'-bis(trifluoroacetyl)actinospectacin.

*Elemental analysis.*—Calculated for $C_{18}H_{22}F_6N_2O_9$: C, 41.23; H, 4.23; N, 5.34; F, 21.74. Found: C, 40.30; H, 4.29; N, 5.16; F, 21.93.

*Example 2.—N,N'-bis(trifluoroacetyl)actinospectacin*

A solution of 3.32 gm. of dried actinospectacin in 75 ml. of ethylene glycol dimethyl ether was treated first with 2.02 gm. of triethylamine and then with 4.20 gm. of trifluoroacetic anhydride. After two hours the mixture was concentrated in vacuo to a syrup which was redissolved in 75 ml. of ethyl acetate. After washing this solution twice with 35 ml. portions of water and drying over magnesium sulphate it was concentrated to 10 ml. The concentrate was added to 10 volumes of pentane, and the resulting white precipitate was washed with pentane and dried. The 1.05 gm. of N,N'-bis(trifluoroacetyl)actinospectacin was the same as that produced in Example 1.

*Example 3.—N,N'-bis(trifluoroacetyl)actinospectacin 9-trifluoroacetate*

A solution of 3.34 gm. of actinospectacin base in 300 ml. of absolute ethanol was evaporated to dryness in vacuo. The residue was dissolved in 200 ml. of dried ethylene glycol dimethyl ether. To this was added 3.03 gm. of triethylamine and then 6.30 gm. of redistilled trifluoroacetic anhydride. The solution was stored 1.5 hours at room temperature, then evaporated in vacuo to dryness. When water was added to the residual yellow syrup, it solidified. The solid was isolated, washed with water, then dried to yield 3.3 gm. of N,N'-bis(trifluoroacetyl)actinospectacin 9-trifluoroacetate. An aliquot was dissolved in dioxane and precipitated with water to give N,N'-bis(trifluoroacetyl)actinospectacin 9-trifluoroacetate having the following elemental analysis: Calculated for $C_{20}H_{21}N_2O_{10}F_9$: C, 38.72; H, 3.41; N, 4.52; F, 27.56. Found: C, 38.56; H, 3.53; N, 4.45; F, 27.77.

We claim:

1. N,N'-bis(trifluoroacetyl)actinospectacin which has the formula

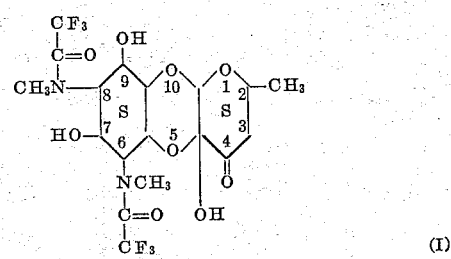

(I)

2. N,N'-bis(trifluoroacetyl)actinospectacin 9-trifluoroacetate which has the formula

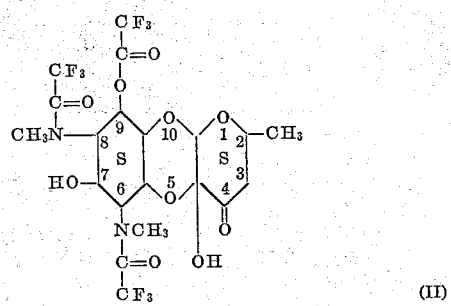

(II)

References Cited by the Examiner

UNITED STATES PATENTS 2,538,766 1/51 Crooks et al. _____ 260—562
2,895,826 7/59 Salminen et al _____ 260—562

NICHOLAS S. RIZZO, *Primary Examiner.*

UNITED STATES PATENT OFFICE
CERTIFICATE OF CORRECTION

Patent No. 3,184,478            May 18, 1965

Robert D. Birkenmeyer et al.

It is hereby certified that error appears in the above numbered patent requiring correction and that the said Letters Patent should read as corrected below.

Column 1, lines 53 to 65, for that portion of the formula reading $$CF_3\overset{|}{N}- \qquad read \qquad CH_3\overset{|}{N}-$$

column 2, line 29, for "(meg./ml.)" read -- (mcg./ml.) --; line 55, for "N.N'-" read -- N,N'- --.

Signed and sealed this 15th day of February 1966.

(SEAL)
Attest:

ERNEST W. SWIDER            EDWARD J. BRENNER
Attesting Officer            Commissioner of Patents